March 5, 1968     C. B. GWYN, JR     3,371,414
METHOD AND APPARATUS FOR FORMING COMPOSITE
ELECTRICAL CONTACT ELEMENTS
Filed Feb. 9, 1965     3 Sheets-Sheet 1
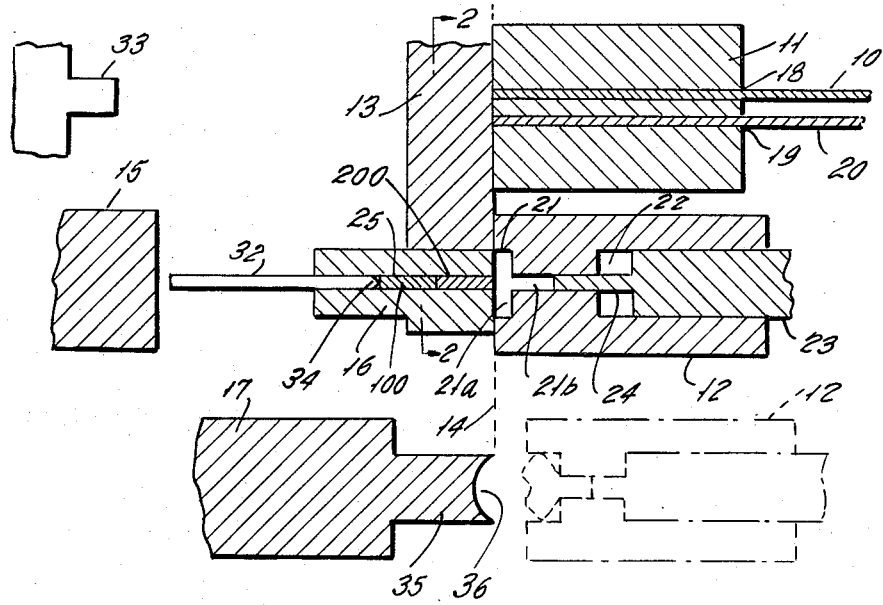
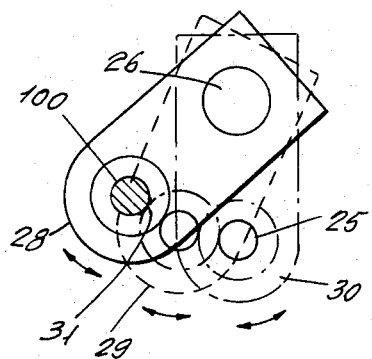
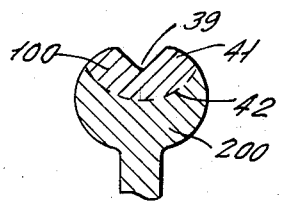
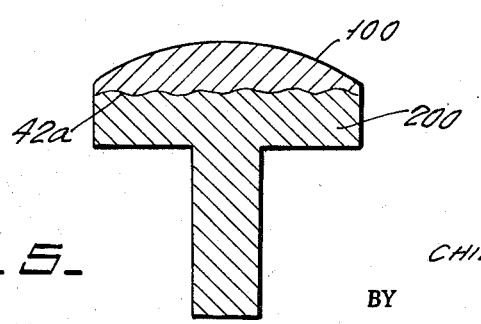
INVENTOR.
CHILDRESS B. GWYN, JR.
BY
OSTROLENK, FABER, GERB & SOFFEN
ATTORNEYS

INVENTOR.
CHILDRESS B. GWYN, JR.
BY
OSTROLENK, FABER, GERB & SOFFEN
ATTORNEYS

March 5, 1968 C. B. GWYN, JR 3,371,414
METHOD AND APPARATUS FOR FORMING COMPOSITE
ELECTRICAL CONTACT ELEMENTS
Filed Feb. 9, 1965 3 Sheets-Sheet 3

INVENTOR.
CHILDRESS B. GWYN, JR.
BY
OSTROLENK, FABER, GERB & SOFFEN
ATTORNEYS

United States Patent Office 3,371,414
Patented Mar. 5, 1968

3,371,414
METHOD AND APPARATUS FOR FORM-
ING COMPOSITE ELECTRICAL CON-
TACT ELEMENTS
Childress B. Gwyn, Jr., Export, Pa., assignor to
Talon, Inc., Meadville, Pa., a corporation of
Pennsylvania
Continuation-in-part of application Ser. No. 154,205,
Nov. 22, 1961, which is a continuation-in-part of
application Ser. No. 72,906, Dec. 1, 1960. This
application Feb. 9, 1965, Ser. No. 431,310
5 Claims. (Cl. 29—630)

ABSTRACT OF THE DISCLOSURE

Method and apparatus for forming composite electrical contact elements by sequentially feeding and shearing stock materials for forming the contact working face and body portions of such elements and bonding the resulting components by cold heading operations.

This application is a continuation-in-part of application Ser. No. 72,906, filed Dec. 1, 1960 and now abandoned, and application Ser. No. 154,205 filed on Nov. 22, 1961 and now U.S. Patent No. 3,191,276 issued on June 29, 1965.

This invention relates to a method and apparatus for forming composite electrical contact elements, each of which incorporates a contact working face portion having a substantially uniform thickness and, integral therewith, a contact body portion. More particularly, the invention relates to such a method, and to a header assembly useful in the practice thereof, for producing composite contact elements, e.g., rivet or screw contacts, employing cold heading operations.

In the folowing specification, all parts and percentages are given by weight, unless otherwise indicated.

Many methods have previously been proposed for the manufacture of composite electrical contact elements. The earliest of such proposals involved relatively complex operations, such as brazing, welding, puddling, or the like, and required sequential manipulation of several components for each composite contact element to be manufactured, e.g., a silver contact face component, a steel or copper contact body component, and a suitable soldering or brazing medium. Such procedures also generally required additional operations for finishing and sizing the composite contact formed to meet dimensional specifications, and frequently involved initial electro-plating steps as well. Illustrative of such earlier procedures are those disclosed in my prior U.S. Patents Nos. 2,049,771 and 2,199,241, for example.

More recently, several procedures for forming composite contact elements by cold heading operations have been described in the literature. One such method, disclosed in Cooney U.S. Patent No. 2,739,369, granted on March 27, 1956, involves the cold heading of components which may, for example, be in the form of wire elements, within an open die. Two pairs of such elements are subjected to a single forming blow, employing the respective pairs as anvils for mutual expansion of the individual elements of the opposing pair of elements, the individual elements thereby bonding to one another at a number of individual metallically bonded spots. The Cooney patent teaches that it is necessary, in the procedure there described, to initially clean the individual wire or other elements to be bonded to remove surface films, prior to attempting to cold bond the same.

In fact, it has been found that even when such elements are cleaned prior to bonding composite electrical contacts produced in accordance with the procedure described in the aforesaid Cooney patent do not possess sufficient shear strengths to permit prolonged operation when subjected to the mechanical and electrical stresses accompanying use. Moreover, commercial practice has indicated that, employing the Cooney procedure, composite contact elements having contact working face portions greater than about 0.015 inch in thickness cannot readily be produced, and such composite elements as may be produced in large-scale operations do not possess substantially uniform face portion thicknesses.

A further procedure for cold bonding the working face and body portions of a composite electrical contact is disclosed in Zysk et al. U.S. Patent No. 3,026,603 issued on Mar. 27, 1962. The Zysk et al. patent describes a method for bonding a contact base metal wire section, which has previously been cleaned to remove surface contaminants, to a precious metal contact face slug, which is initially confined to present a free end engaging the wire section. The patent teaches applying upsetting pressure axially of the pair of components while simultaneously progressively releasing the precious metal slug from confinement to expand the abutting ends of the components into an open die cavity.

The Zysk et al. procedure, like that described in the aforesaid Cooney patent, thus requires the prior cleaning of at least one of the components to be bonded. Moreover, it has been found that the bonds produced between the face and body portions of composite contacts produced in accordance with the teachings of Zysk et al. are insufficient to provide adequate shear strengths insuring prolonged contact life, and that the face portions of such contacts do not possess the substantially uniform thicknesses required for many applications.

It has also been suggested, in Rozmus U.S. Patent No. 3,106,013 granted on Oct. 8, 1963, that work pieces may be butt welded without prior cleaning operations, by cold bonding the abutting elements immediately after shearing from stock material. This patent, however, relates to a procedure in which a pair of such elements is bonded within an open die cavity, the bonding being limited to the extent of the projections of the respective elements into such cavity, and being accompanied by the formation of flash material peripherally of the cold-bonded work pieces. Such flash material must thereafter be removed from the butt welded assembly.

It is among the objects of the present invention to provide a relatively simple method for forming composite electrical contact elements, which does not involve the relatively complex and expensive operations employed in prior brazing or soldering techniques for forming such contacts, e.g., does not involve initially electro-plating refractory metal backings for such elements, nor special sizing, welding, or soldering operations, nor require separate handling of the several components of the composite elements intermediate the initial and final steps of the forming procedure.

A further object of the invention is to provide such a method employing the cold heading of base metal and precious or semi-precious metal components for forming the body and face portions of the desired composite contact elements, yet which does not require the prior cleaning of the components to be thus bonded, and which does not produce excess flash or other undesirable waste material.

Another object of the invention is to provide a cold heading method which results in the formation of composite contact elements exhibiting markedly greater shear strengths and having face portions of substantially uniform thicknesses, as compared with composite contact elements produced by heretofore known cold heading procedures.

A still further object of the invention is to provide a header assembly for rapidly and efficiently forming composite contact elements in accordance with the present invention with a minimum of manual manipulations.

Other objects and advantages of the invention will be apparent from a consideration of the following description thereof.

I have found that composite electrical contact elements exhibiting superior shear strengths and including integral contact body and working face portions, which face portions have substantially uniform thicknesses, may be produced by shearing longitudinally elongated components for forming the face and body portions, respectively, of each such element from stock material, e.g., wire stock; aligning the two components in end-to-end, abutting relation; and, within no more than about two seconds after shearing the components from stock, imparting a first forming blow endwise thereof to apply an axial pressure of at least about one ton per square inch to the abutting components and thereby expand the components adjacent their interface at least about 1.5 times the initial diameter of each such component, effecting interfacial molecular bonding therebetween. The thus initially bonded members are then subjected to at least one additional forming blow endwise thereof to apply a further axial pressure of at least about one ton per square inch thereto, the pressure simultaneously effecting expansion of the abutting, bonded ends of the contact body and face portion components into the shape of one of the desired composite elements. The resulting element is thereafter removed from the die in which it is formed and the sequential shearing and forming operations rapidly repeated to produce at least 20, preferably from about 80 to 400, of the composite contact elements per minute.

It has been found that, by subjecting the abutting contact components to two or three forming blows of the indicated magnitude within a very short period after shearing the same from stock material, viz, within no more than about two seconds and preferably from about 0.05 to 0.5 second, markedly superior composite contact elements may be produced than heretofore obtained by cold bonding operations. Moreover, the present method may be carried out without initially cleaning the component members to be bonded, and without producing any flash or other waste material which must be removed from the composite element produced.

The method of the invention has been found useful in the manufacture of both composite rivet and screw contacts, constituted of a wide range of component materials, and in a wide range of sizes. Rivet contacts produced employing the method of the present invention may, for example, have shanks varying from about 0.04 to 0.250 inch in diameter and heads varying from about 0.06 to 0.75 inch in diameter. Moreover, the rivet heads thus produced may vary from about 0.02 to 0.125 inch in thickness and may include facing portions having substantially uniform thicknesses varying from about 0.005 inch to 75% of the overall head thickness, preferably from about 0.005 to 0.093 inch. In contrast thereto, commercially available composite rivet contacts produced in accordance with the methods described in the aforesaid Zysk et al. and Cooney patents have only been produced in sizes having maximum head diameters of 0.187 inch, head thickness of 0.035 inch and shank diameters of 0.093 inch, and including facing thicknesses varying only from 0.005 to 0.015 inch.

The working face of the composite contacts produced in accordance herewith is desirably sheared from a precious or semi-precious stock material, e.g., wire stock. Such component may, as known in the art, be constituted of gold, silver, platinum or palladium, alloys of gold, silver, platinum, palladium, ruthenium or iridium, or ductile mixtures of such materials in admixture with, for example, one or more of the following: nickel, cobalt, copper, carbon, iron, lead, zinc, cadmium, cadmium oxide, tungsten, molybdenum or rhenium. The last named mixtures should have ductilities ranging from about 25,000 to 85,000, preferably from 30,000 to 60,000 p.s.i. Mixtures so useful include, for example, 85% silver-15% nickel, 90% silver-10% iron, 97% silver-3% carbon, 88% silver-12% cadmium oxide, and 75% silver-25% tungsten.

The component which, in accordance with the invention, is cold headed to form the body portion of each of the desired composite contact elements is, like the first mentioned component, desirably in the form of a wire element. Such component may be constituted of any suitable contact body material such, for example, as copper, a copper alloy, nickel, iron, an iron alloy or aluminum. Preferably, copper and copper alloys, e.g., commercial bronze (90% copper-10% zinc), naval brass or any of the more commonly known "high" brasses containing more than 50% copper, are so utilized.

In accordance with the invention, the two components to be bonded are aligned in end-to-end abutting relation and, within no more than about two seconds, preferably from about 0.05 to 0.5 second, after shearing such components from wire or other stock material, are subjected to a first forming blow sufficient to produce interfacial molecular bonding therebetween. It has been found that components thus bonded need not be cleaned prior to cold heading and will, nevertheless, with two or three forming blows, be integrated into a single composite contact element possessing shear strengths greater than heretofore obtained by cold heading of wire slugs which have been separately manipulated and/or cleaned prior to cold heading.

The first forming blow is applied endwise of the abutting contact components and is of sufficient magnitude to impart an axial pressure of at least one ton per square inch, and preferably from about 20 to 150 tons per square inch, to the respective components. The pressure effects simultaneous expansion of the abutting ends of the pair of components to at least 1.5 and up to as much as ten times the initial diameter of each such component. Preferably, the magnitude of the first forming blow and the dimensions of the forming die in which mutual expansion of the abutting ends of the contact components is effected are so regulated that the components are expanded from about 2 to 4 times their initial diameter to produce an integral expanded interface therebetween.

Further in accordance with the invention, the bonded element thus produced is subjected to one or two additional forming blows to conform the composite element to the shape of a closed forming die defining the shape of the desired composite contact element. Surprisingly, the use of at least one further forming blow has been found to produce a more than fivefold increase in the shear strength of the resulting composite element, as compared with elements produced employing only a single forming blow as described hereinabove. Moreover, it has been found that the use of an additional forming blow or blows produces markedly more uniform contact working face thicknesses than can be provided employing only a single forming blow as aforesaid.

The header assembly for forming composite contact elements in accordance with the present invention includes a feed die disposed adjacent a shear plane and having a pair of longitudinally extending feed passages terminating in openings abutting such plane. The first of the passages in the feed die is provided for feeding a first wire stock for forming the face portion of the composite contact elements and the second of such passages is provided for feeding a second wire stock for forming the body portion of the composite elements. Additionally disposed adjacent the shear plane, and spaced from the feed die, is a forming die having an enlarged recess for receiving wire components separated from the wire stock materials. The recess, in which mutual upsetting and bonding of the wire components is effected, has an internal diameter as least 1.5 times the internal diameters of each of the feed die passages.

A cutter bar having a bore extending therethrough is pivotally mounted adjacent the shear plane opposite from the feed and forming dies, such that an opening at one end of the bore communicating with the shear plane describes an arc, upon pivoting the cutter bar, between a first position in alignment with a first of the feed passages in the feed die, a second position in alignment with the second of the feed passages in such die, and a third position in alignment with the recess in the forming die. Shear means is also associated with either the feed die or the cutter bar for shearing the wire components fed through the passages in the feed die into the cutter bar bore, upon pivoting the cutter bar between its several positions.

A pair of forming elements is associated with the cutter bar and forming die of the header assembly, respectively. The first forming element is adapted to be aligned with the cutter bar bore, when it is in its third position, for imparting a first forming blow to the pair of wire components to effect upsetting and bonding thereof within the forming die recess. The second forming element is designed to be aligned with the forming die, after completion of the first forming blow, to impart a second forming blow to the bonded components. The second former also includes mechanism for entering the recess in the forming die to close the die and press the wire components into the shape of the desired composite contact element. Finally, the header assembly includes means for ejecting each of the composite elements formed thereby from the recess in the forming die.

The method and apparatus of the present invention will be more fully understood from the following detailed description of a preferred embodiment thereof, taken in connection with the accompanying drawing, in which:

FIGURE 1 is a longitudinal section through a header assembly incorporating one embodiment of the invention, with conventional elements of the assembly deleted for purposes of clarity;

FIGURE 2 is a partial section viewed in the direction of the line 2—2 in FIGURE 1, showing the face of the cutter bar, and indicating the various positions of the bore extending therethrough, upon pivotal movement of the bar;

FIGURE 4 is a cross-section through an intermediate composite contact element produced after the first forming blow of the invention; and FIGURE 5 is a cross section through a finished composite rivet contact produced in accordance herewith.

Figure 3A:
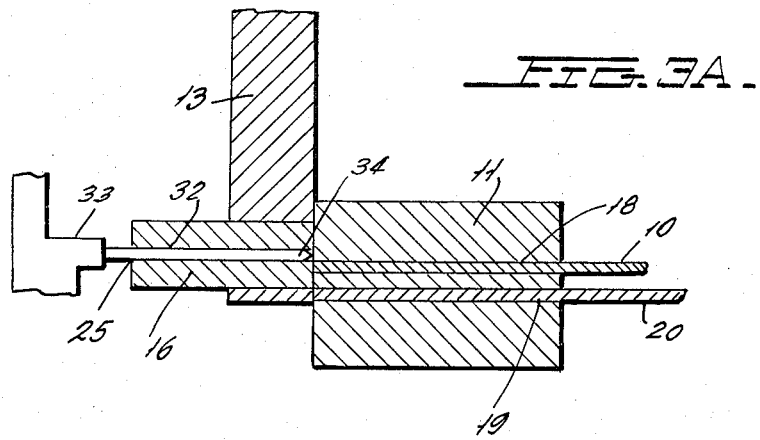
FIGURE 3 is a series of longitudinal sections similar to FIGURE 1, illustrating the sequential stages of the method for forming composite electrical contact elements employing the illustrated header assembly.

Turning to the drawings, the preferred embodiment of the header assembly illustrated in FIGURE 1 includes a feed die 11 and a forming die 12 disposed in spaced relation from one another and abutting a cutter bar 13 along a shear plane designated at 14 in FIGURE 1. A first forming member or hammer 15 is aligned with a cutter die 16 mounted in cutter bar 13 and a second forming member or punch 17 is spaced from the hammer 15, adapted to impart at least one further forming blow to the composite element to be formed, upon movement of the forming die 12 into alignment therewith, as specified more fully hereinafter.

The feed die 11 is a stationary member which may be mounted in a holder in a conventional header, and which includes a pair of longitudinally extending, elongated passages 18 and 19 communicating at one end with the shear plane 14 adjacent cutter bar 13. Stock material, preferably wire stock, for forming the face and body portions, respectively, of the desired composite contact elements is designed to be fed through the feed passages 18 and 19. As illustrated, silver and copper wires 10 and 20 for forming such components may thus be fed through the feed die 11, the wire feed being effected by a suitable, intermittently actuated feed mechanism.

Forming die 12 is mounted in a conventional holder to permit displacement of the die from its initial position shown in full line in FIGURE 1 to the further position illustrated in dotted line in such view. As shown, the forming die is aligned with feed die 11 and has an enlarged recess 21 communicating with the shear plane 14 and abutting cutter bar 13. The recess 21 includes, in the illustrated embodiment for forming rivet contact elements, a head-forming section 21a and a shank-forming section 21b. Section 21a of recess 21 possesses a diameter which is at least 1.5 times, and preferably from 2 to 4 times, the diameter of the feed passages 18 and 19 in the feed die 11. The wire segments fed through passages 18 and 19 thus possess diameters less than ⅔ the diameter to which they are expanded when mutually upset within the section 21a of the forming die.

Preferably, the forming die 12 incorporates a second recess 22 communicating with the shank-forming section 21b of recess 21 for receiving an ejector member 23 for removing the composite contact elements after formation thereof. The ejector member may be actuated by conventional header mechanism and includes a hammer element 24 reciprocally movable into the shank section 21b to eject the formed contact element from recess 21.

The cutter die 16 mounted on cutter bar 13 includes a center bore 25 for receiving components 100 and 200, respectively, sheared from wires 10 and 20, to be cold headed in accordance with the invention. The bore 25 preferably has the same diameter as passages 18 and 19, in order that the wire segments fed into the bore from such passages are slidably movable, yet cannot be laterally expanded, therein.

As best seen in FIGURE 2, the cutter bar 13 is pivotally mounted as by a pin 26 for reciprocal movement. The center bore 25 thereof may thus be oscillated through an arc, upon pivoting the cutter bar, between a first position (indicated at 28 in FIGURE 2 and shown in FIGURE 3B), in which it is aligned with feed passage 18 of feed die 11; a second position (indicated at 29 in FIGURE 2 and shown in FIGURE 3C), in which it is aligned with feed passage 19 of the feed die; and a third position (indicated at 30 and shown in FIGURE 3D), at which it is aligned with recess 21 in the forming die 12.

The wire components 100 and 200 are sheared from the wire stock material by a shear surface or knife edge 31 provided on the cutter bar 13 adjacent the bore 25 thereof. The knife edge is so disposed relative to bore 25 that it serves to smoothly shear components 100 and 200 from the wire stock 10 and 20, respectively, as the cutter bar is pivoted between the first, second and third positions of bore 25 specified above. Alternatively, it will be understood that shear surfaces may be associated with the openings of feed passages 18 and 19 on the face of the feed die, in order to effect smooth and rapid shearing of the desired contact components from the wire stock fed therethrough.

A hammer pin 32 is slidably disposed for movement through the center bore 25 of the cutter die, the pin being actuated by hammer 15 to effect the first forming blow on components 100 and 200. Movement of the hammer pin 32 is limited by an adjustable stop 33, which determines the projecting length of components 100 and 200 into bore 25. Desirably, the hammer pin includes a tapered leading edge 34 which may suitably be conical in shape, for producing a central depression in the composite element produced by the first forming blow, as will be discussed more fully hereinafter.

Figure 3B:
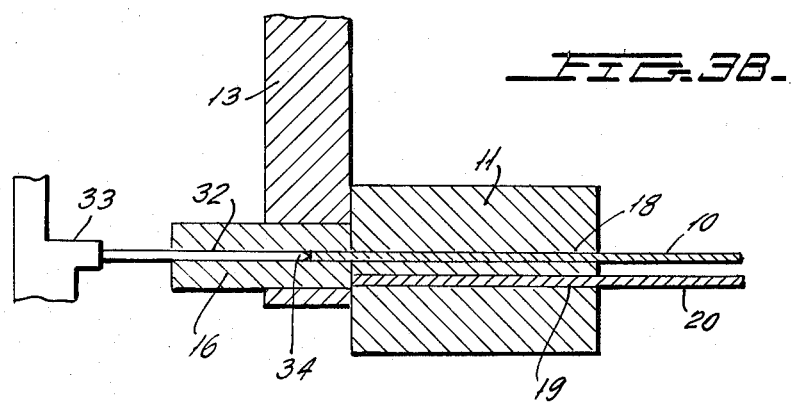
Figure 3C:
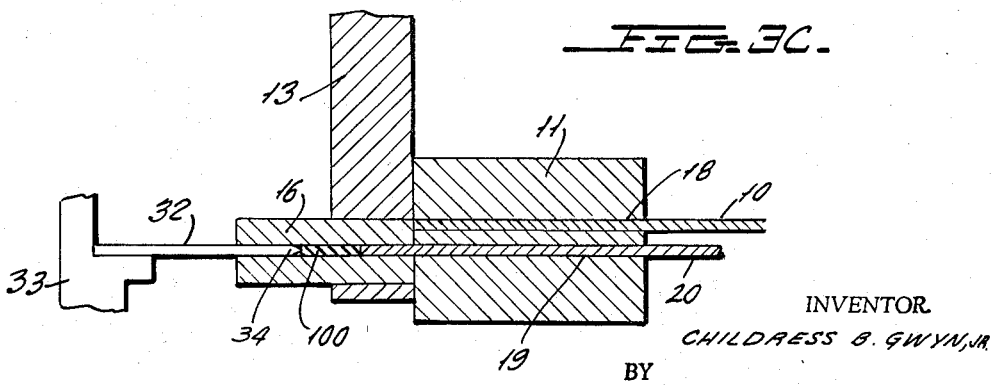
Figure 3D:
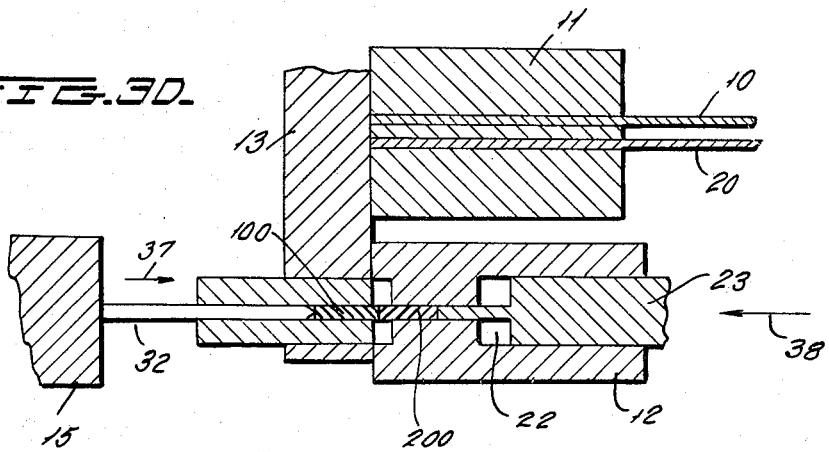
Figure 3E:
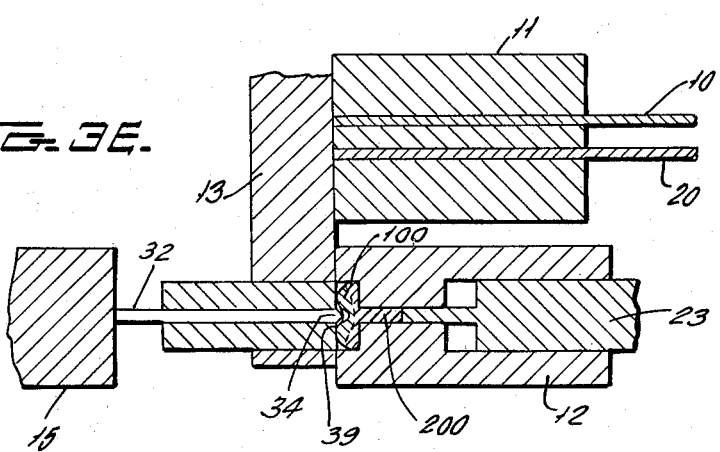
Figure 3F:
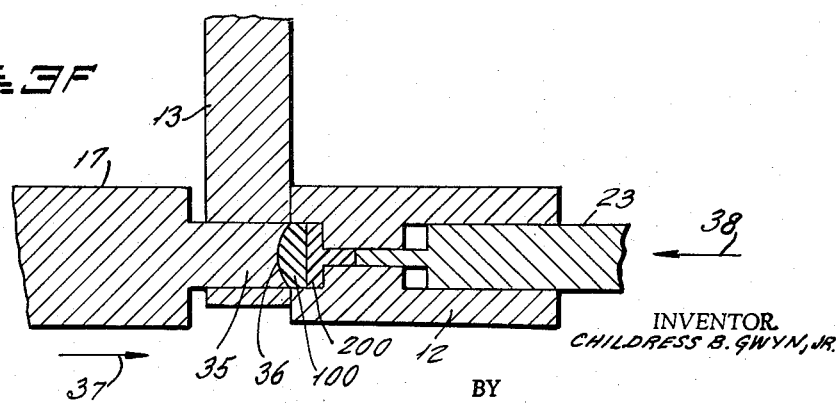

As indicated above, the forming die 12 is mounted in a suitable holder which may be shifted by the driver cam or rocker plate of a conventional header device into its second position adjacent the punch 17 (FIGURE 3F).

The punch 17 includes an extension 35 having a concave forming surface 36 for imparting the second and, if desired, third forming blows to the composite element. As shown in FIGURE 3F, the punch 17 is so mounted with respect to the forming die 12 that the forming surface 36, when driven toward the forming die, enters section 21a of the recess therein, thereby closing the die.

The preferred procedure of the present invention is illustrated in the successive stages of FIGURE 3. Initially, as shown in FIGURE 3A, the cutter bar is so positioned that the bore 25 thereof is not aligned with either of feed passages 18 or 19 in the feed die 11. In such position, the wire stock materials 10 and 20 fed through the feed die bear against the abutting face of the cutter bar, preventing feed of such materials through passages 18 and 19.

Upon actuation of the header drive mechanism, the cutter bar is pivoted into the position shown in FIGURE 3B, in which the bore 25 of cutter die 16 is aligned with the feed passage 18. The feed mechanism for wire stock 10 forces the component 100 of wire 10 into bore 25, pushing the hammer pin 32 outwardly of the cutter die until it strikes stop 33.

After striking stop 33, the cutter bar is further pivoted into the position illustrated in FIGURE 3C. As such pivotal movement is initiated, the knife edge 31 smoothly shears component 100 from the wire stock.

The wire stock 20 for forming the body portion of the composite contact element is thereafter fed into bore 25 and the component 200 sheared therefrom in the same manner as indicated above in connection with wire component 100. The contact face and body portion components are thus disposed in bore 25 in end-to-end abutting relation, the component 100 for forming the face portion of the composite element being disposed adjacent the hammer pin 32.

The cutter bar 13 is thereafter pivoted into the further position shown in FIGURE 3D, with the bore 25 thereof aligned with the recess 21 in forming die 12. Subsequent actuation of the hammer 15 drives the hammer piston 32 in the direction of arrow 37 imparting a first forming blow to the juxtaposed wire components 100 and 200. Preferably, as illustrated in FIGURE 3D, the ejector member 23 is simultaneously actuated in the direction of arrow 38, axial pressure thereby being applied to the juxtaposed components 100 and 200 to effect mutual upsetting of the abutting ends thereof into the enlarged section 21a of the recess in the forming die. The force applied to members 15 and 23 is such that pressures of greater than one ton per square inch, and preferably from about 20 to 150 tons per square inch, are thus impressed upon the abutting contact components, the mutual expansion thereof effecting interfacial molecular bonding therebetween.

During the forward stroke of the hammer pin 32, the conical edge 34 thereof forms a depression 39 in the adjacent end of the bonded element produced thereby.

As best shown in FIGURE 4, the composite element resulting from the first forming blow includes the aforesaid central depression 39 and an annular protuberance 41 formed in the working face portion component 100 thereof by the action of the conical edge 34 of the hammer pin. The face portion component 100 and the contact body component 200 are intimately bonded across the entire area of interface 42 therebetween, and have been expanded at least 1.5 times the initial diameter of such segments.

The forming die 12 is thereafter shifted into the position illustrated in FIGURE 3F and the punch 17 actuated in the direction of arrow 37 to effect the second forming blow on the composite contact element previously formed within the forming die recess 21. Preferably, the ejector member 23 is simultaneously actuated in the direction of arrow 38 to impart an axial pressure in excess of one ton per square inch to the bonded components.

The concave forming surface 36 of punch 17 is driven into the forming recess, closing the same and thereby forcing the composite components into the shape defined by the internal walls of the head-forming section 21a and the shank-forming section 21b thereof.

The punch 17 may, if desired, be reactuated to subject the composite contact element thus formed to a further forming blow to thereby increase the shear strength thereof. Upon retraction of the punch, after thus imparting one or more forming blows, the finished contact element is ejected from the forming die by re-actuating ejector member 23, the extension 24 thereof forcing the composite element out of recess 22. The composite rivet thus produced is illustrated in FIGURE 5. As shown, the silver component 100 defining the contact working face portion of the composite element and the copper component 200 defining the body portion of the composite element, including the shank and a portion of the head thereof, are intimately bonded across substantially the entire interfacial area 42a therebetween. After formation of such composite element, the cutter bar may be reciprocated back to its initial position by conventional header mechanism and further contact elements formed, employing the indicated procedure. In this manner, at least 20, and preferably from 80 to 400, composite contact elements are formed per minute, employing each such header assembly.

The improved bonding effected by use of the present invention is evidenced by the following test results, in which bonding of copper and silver wire contact components was effected employing one, two and three forming blows for comparative purposes. Each of the forming blows was carried out in a header assembly substantially as described above, subjecting the composite segments bonded to axial pressures of about 30 tons per square inch during bonding. Composite rivet contacts having head diameters varying from 0.125 to 0.437 inch were thus prepared and the shear forces required to separate the contact components determined. The data thus obtained is tabulated below:

| Contact Head Diameter (Inches) | Single Blow Bonding (Inch pounds) | Two Stage Bonding (Inch Pounds) | Three Stage Bonding (Inch Pounds) |
|---|---|---|---|
| 0.125 | 60 | (1) | (2) |
| 0.150 | 50 | 340 | 370 |
| 0.187 | 45 | 260 | 290 |
| 0.218 | 36 | 200 | 270 |
| 0.250 | 23 | 185 | 255 |
| 0.312 | 17 | 120 | 210 |
| 0.375 | (3) | 95 | 180 |
| 0.437 | (3) | 80 | 140 |

¹ Head sheared off, no separation at 300 inch pounds.
² Same as Two Stage Bonding.
³ No bond.

Composite electrical contact elements must be able to withstand shear forces of at least 50 inch pounds to provide adequate assembly and operational safety. It will be noted from the above values that all contacts produced employing a single forming blow and having head diameters in excess of 0.150 inch did not possess adequate shear strengths by such criterion, whereas all of the composite contact elements produced employing multiple forming blow operations of the present invention possessed well over the minimum shear strengths required for general service.

It will be understood that various changes may be made in the preferred embodiments of the method and apparatus described hereinabove without departing from the scope of the present invention. Accordingly, it is intended that the preceding descripition be interpreted as illustrative and not in a limiting sense.

What is claimed:

1. A method of forming a composite electrical contact element incorporating a contact working face portioned and, integral therewith, a contact body portion, which method comprises:

(a) feeding a first continuous stock material for forming said working face portion of the contact element into one end of an elongated bore having substantially the same cross-section as said stock material;

(b) indexing the first stock material within said bore by feeding the material through the bore to displace a hammer element disposed therein until said hammer element engages a first stop member, thereby determining the length of the first stock material fed into the bore;

(c) shearing the incremental portion of the first stock material thus fed into said bore to provide a first contact-forming component;

(d) feeding a second continuous stock material for forming said contact body portion of the contact element into said one end of the elongated bore;

(e) indexing the second stock material within said bore by feeding the material through the bore to displace said first contact-forming component and said hammer element until the hammer element engages a second stop member, thereby determining the length of the second stock material fed into the bore;

(f) shearing the incremental portion of the second stock material thus fed into said bore to provide a second contact-forming component, the first and second contact-forming components being disposed in end-to-end, abutting relation totally within said bore;

(g) aligning said one end of said bore with a discrete die cavity having the configuration of the composite contact element to be formed, said cavity incorporating at least an enlarged section having a diameter at least 1.5 times the diameter of each of said components;

(h) within two seconds after shearing the contact-forming components from stock, forcing the hammer element through said bore to displace said components outwardly through said one end thereof until the second contact-forming component engages a stop-ejection member disposed in stationary relation within said die cavity;

(i) continuing to force the hammer element toward the stop-ejection member to impart a first forming blow to the contact-forming components to apply an axial pressure of at least one ton per square inch to the abutting components and effect expansion and cold welding thereof within the enlarged section of said die cavity about their mutual interface within and up to the diameter of said enlarged section;

(j) terminating the first forming blow after all of said first contact-forming component has been extruded into the enlarged section of said die cavity;

(k) removing said bore and aligning the die cavity with a punch whose forming surface has substantially the same cross-section as the enlarged section of the cavity;

(l) forcing said punch against the abutting contact-forming components within said enlarged section to impart at least one further forming blow to the contact-forming components to apply an axial pressure of at least one ton per square inch to the abutting components and concurrently expand said components into the desired shape of the final composite electrical contact element and thereby complete cold-welding of said elements; and (m) removing said punch and forcing said stop-ejection member against the composite contact element and through the die cavity to eject said element therefrom.

2. The method as defined in claim 1, for forming rivet-shaped contact elements, in which said die cavity incorporates an enlarged head section and a shank section communicating therewith and having a cross-section substantially equal to that of said bore, the hammer element forcing one end of said second contact-forming component, in step (h), into the shank section of said cavity in order that the successive forming blows imparted in steps (i) and (l) expand the mutual interface between the first and second contact-forming components into the head section of said cavity while maintaining one end of the second contact-forming component within said shank section for formation of the shank end of the desired composite rivet contact.

3. The method as defined in claim 2, for forming rivet shaped contact elements, each of which includes a shank having a diameter of from 0.04 to 0.250 inch and a head having a diameter of from 0.06 to 0.75 inch and a thickness of from 0.02 to 0.125 inch, the head incorporating the contact working face portion and a portion of the contact body portion and the shank incorporating the remainder of the contact body portion.

4. The method as defined in claim 1, in which said first contact-forming component is constituted of a precious or semi-precious metal composition selected from the group consisting of gold, silver, platinum and palladium, alloys of gold, silver, platinum, palladium, ruthenium and iridium, and ductile mixtures containing at least one material selected from the group consisting of gold, silver, platinum, palladium, ruthenium and iridium; and in which said second contact-forming component is constituted of a base metal material selected from the group consisting of copper, nickel, iron and aluminum, and alloys of copper and iron.

5. The method as defined in claim 1, in which the forming blows imparted in steps (i) and (l) are sufficient to apply axial pressures of from 20 to 150 tons per square inch to said contact-forming components, and in which the first forming blow imparted in step (i) is applied within from 0.05 to 0.5 second after shearing said first and second contact-forming components from stock material.

References Cited

UNITED STATES PATENTS

| | | | |
|---|---|---|---|
| 2,739,369 | 2/1956 | Cooney | 29—630 |
| 3,026,603 | 3/1962 | Zyck et al. | 29—630 |
| 3,106,013 | 10/1963 | Rozmus | 29—70.1 |
| 3,191,276 | 6/1965 | Gwyn | 29—630 |
| 3,139,669 | 7/1964 | Gwyn | 29—630 |
| 3,151,385 | 11/1964 | Gwyn | 29—630 |
| 617,270 | 1/1899 | Bladwin | 72—294 |
| 3,031,672 | 5/1962 | Lange | 72—294 |

FOREIGN PATENTS

| | | |
|---|---|---|
| 910,929 | 7/1961 | Great Britain. |
| 1,243,746 | 9/1960 | France. |

JOHN F. CAMPBELL, *Primary Examiner.*

WHITMORE A. WILTZ, *Examiner.*

R. W. CHURCH, *Assistant Examiner.*